Nov. 16, 1948.    B. W. BENBOW    2,453,778
ELECTRICAL CONTACTING EQUIPMENT
Filed Jan. 31, 1944    2 Sheets-Sheet 1
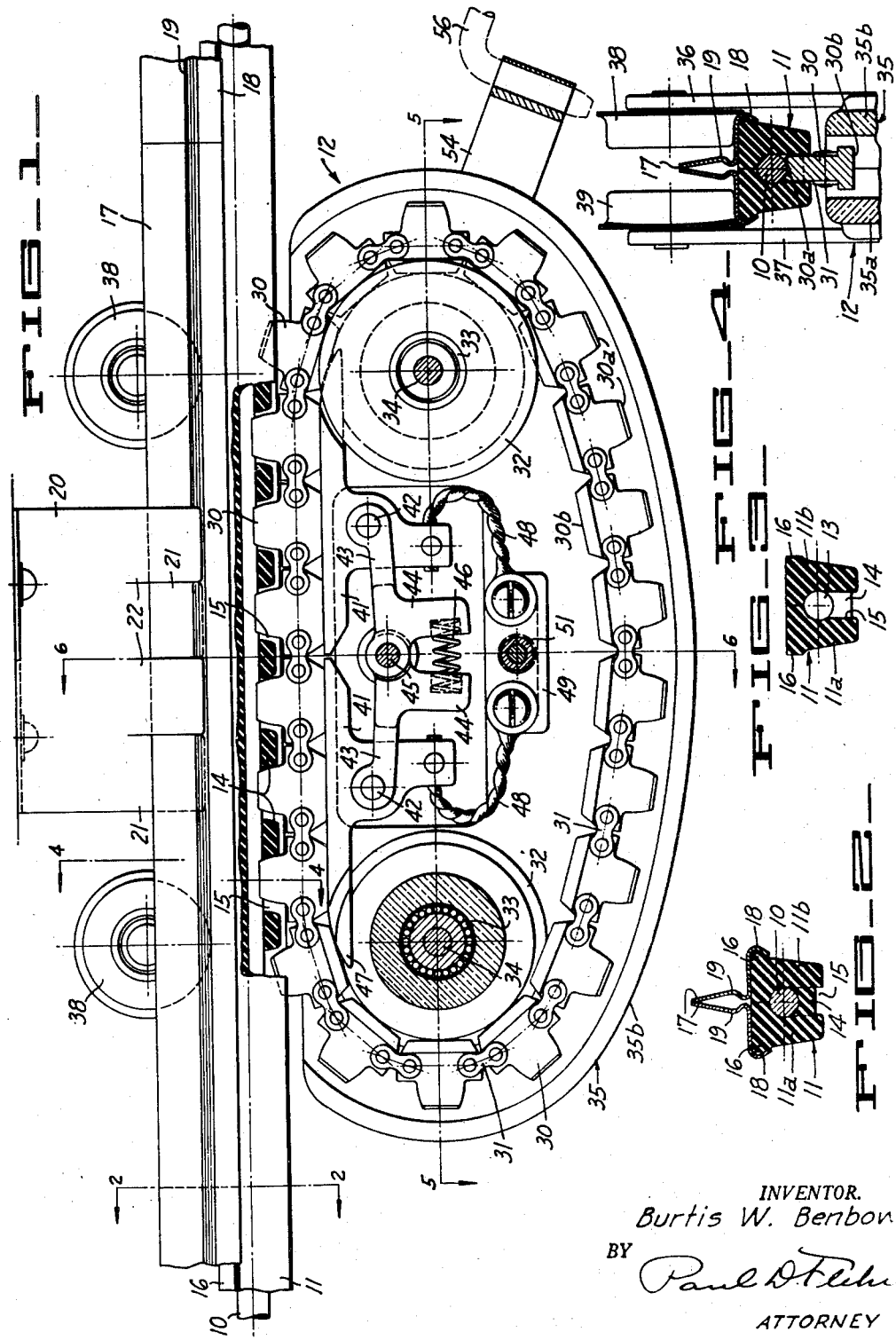
INVENTOR.
Burtis W. Benbow
BY
ATTORNEY Nov. 16, 1948.  B. W. BENBOW  2,453,778
ELECTRICAL CONTACTING EQUIPMENT
Filed Jan. 31, 1944  2 Sheets-Sheet 2
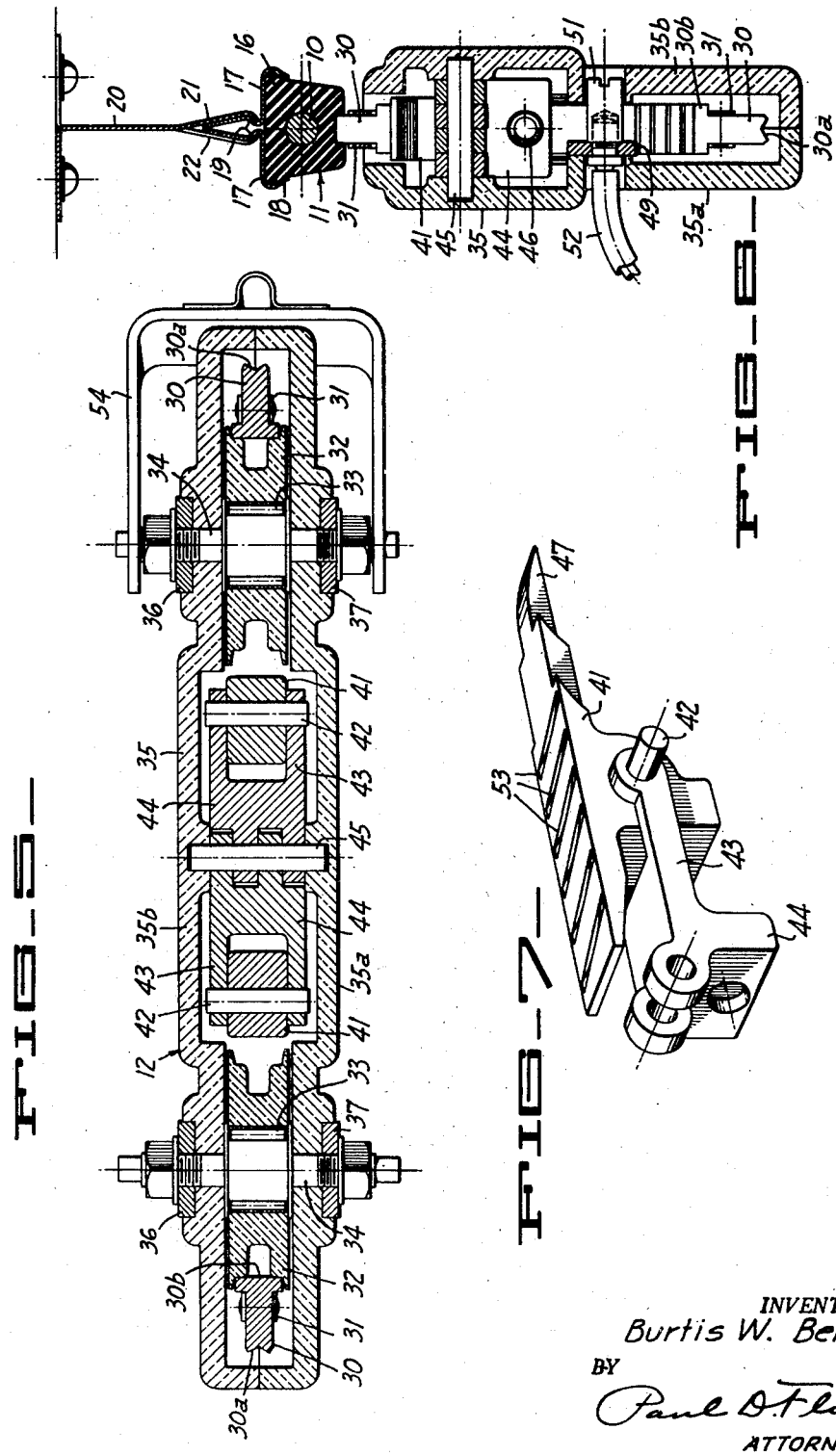
INVENTOR.
Burtis W. Benbow
BY
ATTORNEY Patented Nov. 16, 1948

2,453,778

UNITED STATES PATENT OFFICE 2,453,778

ELECTRICAL CONTACTING EQUIPMENT

Burtis W. Benbow, Benbow, Calif.

Application January 31, 1944, Serial No. 520,399

4 Claims. (Cl. 191—23)

This invention relates generally to electrical equipment of the type making use of a traveling contacting device together with an extended electrical conductor or trolley wire. Such devices can be used advantageously where a trolley arrangement is desirable to supply current to movable appliances like hoists and cranes, or even in some instances, portable hand tools.

It is a general object of the invention to provide improved electrical equipment of the above character, and in particular to improve upon equipment of the type disclosed and claimed in my Patent No. 2,255,874, granted September 16, 1941.

Another object of the invention is to provide an improved form of insulating sheath for a trolley wire and an improved type of mounting for the same which simplifies and facilitates installation.

Another object of the invention is to improve upon equipment of the type disclosed in my Patent 2,255,874, particularly with respect to obtaining good electrical contact with the trolley wire, and good contact between the teeth which contact the trolley wire and bus conductors which convey current from the teeth to a flexible cord or conductor.

Other objects of the invention will be apparent from the following description of a preferred embodiment thereof as illustrated in the accompanying drawing.

Referring to the drawing:

Figure 1 is a side elevational view partly in section showing electrical equipment incorporating my invention.

Figure 2 is a sectional view taken along the line 2—2 of Figure 1 showing the electrical conductor and its insulating sheath, and the mounting means therefor.

Figure 3 is a cross-sectional view of my electrical conductor and its insulating sheath.

Figure 4 is a cross-sectional view taken along the plane 4—4 of Figure 1 showing my traveling electrical contactor in cooperative relation with the electrical conductor and its mounting means.

Figure 5 is a cross-sectional view taken along the line 5—5 of Figure 1.

Figure 6 is a cross-sectional detail taken along the line 6—6 of Figure 1.

Figure 7 is a three-quarter side elevational view showing one of the two bus bar elements of my traveling electrical contactor.

The equipment illustrated in the drawing incorporates the invention disclosed and claimed in my aforesaid Patent No. 2,255,874. However improved features are included as will be hereinafter disclosed.

In general the apparatus consists of an electrical conductor or trolley wire 10 which is enclosed by the insulating sheath 11, and which cooperates with the special traveling electrical contacting device 12. While the insulating sheath 11 can be made of various materials, it is preferably formed of molded resilient material, such as natural or synthetic rubber. A sheath of the type illustrated and a novel method for its manufacture have been disclosed and claimed in my co-pending application Serial No. 769,001, filed August 16, 1947 and entitled "Molding machine and method." This sheath is preferably formed of the two side body portions 11a and 11b, (Figure 3), which have a longitudinal cavity 13 to receive a trolley conductor, and which are joined together by the spaced integral ribs 14. When viewed in section as in Figure 1 the end faces of these ribs are curved like the faces of epicyclic spur gear rack teeth.

To form my sheath I preferably make use of the molding machine and method disclosed in my aforesaid application Serial No. 769,001. However immediately upon withdrawal of the molded sheath from the machine, the back side of the body is split to the recess 13, as shown in Figure 3, and the wire utilized for forming the recess 13 is then withdrawn. It will be evident that a sheath of this sort can be readily applied over a trolley wire simply by pulling the body portions 11a and 11b apart, and forcing the same over the wire. A trolley wire enclosed in such a sheath is completely insulated against accidental contact, and the wire is only exposed for electrical contact through the openings 15 between the teeth 14. To facilitate retention of the sheath within the novel mounting to be presently described, the body portions 11a and 11b are preferably provided with longitudinally extending ridges or ribs 16.

The novel mounting means illustrated consists of a pair of retention strips 17, which can conveniently be formed of pressed sheet metal bent angle shaped as illustrated. The base portions of these strips are provided with turned edges 18, to engage about the longitudinal ridges 16. The adjacent wall portions 19 are preferably shaped substantially as illustrated (Figure 2) whereby when these portions are urged together the turned edge portions 18 are forced into tight engagement with the ribs 16. Thus the two body portions 11a and 11b of this sheath are pressed together about the trolley wire, while at the same time the sheath together with the enclosed cable are adequately held by the strips 17. The complete assembly of strips 17 forms in effect a metal mounting which is substantially T shaped in cross section.

In order to retain the strips 17 together and at the same time to support the assembly upon the structural members of a roof or ceiling, I have provided suitable brackets 20 which can be in the form of a depending sheet metal plate, The lower portion of this plate is slit (Figure 1) to provide spring tabs 21 and 22, which are bent to clip over the adjacent wall portions 19 of the strips 17 (Figure 6). Thus strips 17 are held tightly together while at the same time these strips are adequately supported from a series of brackets 20. As will be presently explained when the assembly is supported in this manner the base portions of the strips 17 for trackways for wheels, which in turn serve to support the traveling contacting device.

The traveling electrical contacting device 12 is similar to that disclosed in my aforesaid patent to the extent that it employs a series of teeth-like conductor elements 30 which are connected together by suitable links 31, to form an endless chain. This chain-like asssembly is trained about a pair of pulley wheels 32, which can be made of suitable insulating material, and which can be provided with suitable bearings 33 on the shafts 34. The pulleys and the associated parts of the contactor device are enclosed within a suitable housing 35 formed of suitable insulating material such as a molded phenolic condensate product. Preferably this housing is formed as two halves 35a and 35b, which are detachably retained together by being bolted to the ends of the shafts 34 (Fig. 5).

In order to properly support the contacting device relative to the trolley wire and sheath, the housing carries upwardly extending members 36 and 37 which in turn carry the flanged wheels 38 and 39. These wheels are adapted to track upon the base portions of the strips 17 substantially as shown in Figure 4.

The end faces of a number of the teeth 30 normally engage and make electrical contact with the trolley wire 10, as shown in Figure 1. The base portions 30b of the teeth 30 are arranged to slide over and make electrical engagement with the bus bars 41. These bus bars are yieldably mounted within the housing 35 by novel means, whereby they are relatively uniformly and yieldably pressed against the base portions 30b of the teeth, to provide good electrical contact at all times without arcing. Thus medial portions of both bars are pivotally connected by pins 42 with the oppositely extending arms 43 of the L levers 44. L levers 44 are pivotally carried by common pin 45, and are urged in opposite directions by the compression spring 46. Thus each of the bus bars 41 is yieldably urged upwardly against the base portions 30b of the teeth 30, and in addition each bus bar is free to rock about the axis of its pivot pin 42. The end extremities 47 of the bus bars are preferably tapered and reduced in width, in order that they may be loosely accommodated within the grooves of wheels 32.

Below the pivot pins 42 both bus conductors 41 are connected by the flexible stranded conductors 48 to the terminal strip 49. This strip in turn is shown connected to the terminal fitting 51 of the insulated conductor 52. It is this conductor which leads the current to the appliance being operated.

In order to minimize friction between the bus bars 41 and the teeth 30, the upper faces of the bus bars can be provided with cavities 53 (Fig. 7) which can be filled with graphite or a like lubricating medium.

In order to facilitate traversing of the contacting device along the trolley wire, I can provide suitable means such as a bail 54 which can be pivotally attached to the ends of one of the shafts 34, and which in turn can connect to any suitable contrivance, such as the pull rod 55.

Operation of the equipment described above can be briefly outlined as follows: The assembly including the insulating sheath and the strips 17 is mounted in the position desired, and supported by the brackets 20. The contacting device 12 is tracked upon this assembly, with the wheels 38 and 39 engaging the base portions of the strips 17, substantially as shown in Figs. 1 and 4. The upper rod of the endless contacting chain is disposed with its teeth entering the openings 15, substantially as shown in Figure 1, and with the end faces 30a of the teeth being pressed upon the exposed portions of the trolley wire. As shown in Figure 4 it is desirable that these end faces of the teeth 30 be provided with a substantially V-shaped groove in order to more adequately seat and center the same with respect to the trolley wire. In the device illustrated in the drawing a minimum of at least five teeth 30 are in continuous contact with the trolley wire. Furthermore all of these teeth are being yieldably urged against the trolley wire by the bus bars 41.

It will be noted in Figure 1 that the length of each opening 15 between the formed insulating teeth or ribs 14, is considerably greater than the length of the formed teeth 30. Also it will be noted that the tooth near the left hand end of Fig. 1, which is about to be retracted from its associated opening 15, has its curved trailing face in abutting contact with the adjacent curved leading face of a rib 14. On the other hand the tooth appearing near the right hand end of Figure 4, which has just been advanced into its associated opening 15 to bear upon the trolley wire, has considerable clearance between both its leading and trailing faces and the adjacent faces of the teeth 14 preceding and behind the same. Between the two teeth 30 just mentioned, the intervening teeth appear in various intermediate positions, indicating that there is a substantial sliding movement between each tooth and the trolley wire, commencing with the instant the tooth engages the trolley wire, and ending with retraction. This sliding or retrograde movement, which necessarily takes place as the contacting device is traversed along the trolley wire, is an important feature of my invention in that it makes for good electrical contact between the teeth 30 and the trolley wire, with a continual self cleaning action. This effect is obtained by virtue of the fact that the distance between the centers of adjacent teeth 30, is substantially less than the distance between centers of the teeth 14. For example in one particular instance the distance between centers of ajacent teeth 30 (when aligned) was made to be about .015 of an inch less than the distance between centers of the teeth or ribs 14 (0.785 in. in this instance). The length of each tooth 30 at its end face 30a was about $\frac{1}{16}$ of an inch. The openings 15 between the ribs 14 measured about $\frac{1}{2}$ of an inch long at the lower face of the trolley wire, and $\frac{1}{16}$ of an inch long between the lowermost ends of the teeth 14. With this dimensioning the teeth 30 entered an opening 15 and seated upon the trolley wire in a position substantially intermediate the adjacent teeth 14, substantially as indicated for the right hand seated tooth of Figure 1. The clearance between this seated booth and each of the adjacent formed faces of teeth 14, was in the neighborhood of $\frac{1}{16}$ of an inch ($\frac{1}{8}$ of an inch in all). In this same example with traversing of the contacting device to the right as viewed in Figure 1, each tooth retrogressed with sliding movement along the trolley wire, approximately 1/16 of an inch. In other words the retrogression or sliding movement amounted to about 20% of the total length of the end contacting face 30a.

With proper proportioning, such as in the example stated above, a tooth 30 being retracted from its associated opening 15 is retracted without sliding or rubbing movement between the advancing face of the tooth 30 and the associated face of a stationary tooth 14. Thus wear between the metal and insulating teeth is reduced to a minimum.

Should the contacting device be moved in an opposite direction to that described above, namely to the left as viewed in Figure 1, then the action between teeth 30 and the trolley wire is the same, excepting however that the right hand tooth 30 which still remains seated upon the trolley wire, will be in abutting engagement with the adjacent rear face of the tooth 14 immediately in front of the same. Likewise the extreme left hand seated tooth 30 will take a position intermediate and out of contact with the adjacent teeth 14. It may be noted at this point that as the tooth 30 enters an opening 15, there will likewise be a total absence of rubbing contact with the faces of adjacent stationary teeth 14. Thus there is likewise complete absence of wear at this point, as well as when a tooth is leaving its associated opening.

It will be evident from the above that my equipment is capable of application to a wide variety of services, including the various services where it is now common to make use of conventional exposed trolley wires, with conventional sliding shoes or trolley wheels. Relatively heavy currents can be taken off through my contacting device without arcing and without wear or pitting of the trolley wire. In general all parts of my equipment have a long useful life without undue wear, and thus expensive servicing such as is common with conventional arrangements, is reduced to a minimum. The work of installing the equipment is reduced to a minimum because of the simple and novel character of the insulating sheath and its mounting.

I claim:

1. In apparatus of the character described, an extended trolley wire, a sheath of insulating material embracing the trolley wire, strips extending along the upper face of the sheath and having portions adapted to interlock with the sheath, said strips being angle shaped to provide base wall portions extending substantially parallel with the upper face of the sheath, a traveling contacting device adapted to cooperate with the trolley wire to make electrical connection with the same, said device including a movable housing, trolley contacting means adapted to engage the trolley wire, and tracking means carried by the housing and adapted to track upon said base portions of said strips.

2. In equipment of the character described, an extended trolley wire, a sheath of insulating material embracing the trolley wire, the lower portion of the sheath being provided with a series of spaced openings separated by gear-like teeth, the openings serving to expose spaced portions of the trolley wire, an endless series of articulated teeth, means for supporting said teeth for traversing movement relative to the trolley wire, means for directing and urging a plurality of said teeth into continuous seating engagement with exposed portions of the trolley wire, and means for causing sliding movement of a tooth with the trolley wire commencing with the seating of a tooth upon the wire and ending with removal of the tooth from an associated opening, such relative sliding movement being opposite to the general direction of movement of the contacting device.

3. In equipment of the character described, an extended trolley conductor, a sheath of insulating material embracing the conductor, said sheath being provided with a series of openings in one side of the same for exposing spaced portions of the trolley wire, the openings being separated by gear-like teeth, a housing adapted to be traversed longitudinally of the trolley wire, a pair of pulley wheels carried by the housing, an endless series of articulated teeth engaging the pulley wheels, said teeth having portions formed gear-like, means for urging one run of said series into engagement with the trolley wire through said openings, whereby a plurality of said teeth have simultaneous and continuous contact with the trolley wire, the distance between centers of the formed portions of said teeth being substantially less than the distance between centers of the teeth of the insulating sheath, and the formed portions of the contacting teeth being dimensioned substantially smaller than the openings in the insulating sheath, thereby causing relative sliding movement between each tooth and the trolley wire while the same is seated upon the wire and as the housing is traversed.

4. In apparatus of the character described, an extended trolley wire, a sheath of insulating material embracing the trolley wire, and metal mounting means substantially T-shaped in cross section extending longitudinally of the sheath, said mounting means comprising base portions extending along the upper face of the sheath and having edges of the same adapted to interlock with the sheath, a traveling contacting device adapted to cooperate with the trolley wire to make electrical connection with the same, said device including a movable housing, a trolley contacting means adapted to engage a trolley wire, and tracking means carried by the housing and adapted to track upon said base portions of said mounting.

BURTIS W. BENBOW.

REFERENCES CITED

The following references are of record in the file of this patent:

UNITED STATES PATENTS

| Number | Name | Date |
| --- | --- | --- |
| 884,630 | Bauer | Apr. 14, 1908 |
| 1,448,195 | Chandler | Mar. 13, 1923 |
| 1,623,920 | Harris | Apr. 5, 1927 |
| 1,821,786 | Ballew | Sept. 1, 1931 |
| 1,934,510 | Schaake | Nov. 7, 1933 |
| 1,987,104 | Guthrie | Jan. 8, 1935 |
| 2,115,135 | Benbow | Apr. 26, 1938 |
| 2,117,480 | Harvey | May 17, 1938 |
| 2,156,827 | Wehr | May 2, 1939 |
| 2,170,296 | Frank et al. | Aug. 22, 1939 |
| 2,227,625 | Benbow | Jan. 7, 1941 |
| 2,255,874 | Benbow | Sept. 16, 1941 |
| 2,267,207 | Martin | Dec. 23, 1941 |
| 2,278,761 | Benbow | Apr. 7, 1942 |
| 2,304,720 | Wehr | Dec. 8, 1942 |